United States Patent [19]
Belknap

[11] 3,861,437
[45] Jan. 21, 1975

[54] TRACTION DEVICE FOR VEHICLE TIRES

[76] Inventor: John C. Belknap, 229 S. Shore Dr., Buffalo, N.Y. 14219

[22] Filed: Aug. 23, 1972

[21] Appl. No.: 283,224

[52] U.S. Cl. ............................................ 152/225 C
[51] Int. Cl. .......................................... B60c 27/02
[58] Field of Search ............................... 152/225 C

[56] References Cited
UNITED STATES PATENTS

| | | | |
|---|---|---|---|
| 2,612,202 | 9/1952 | Bumbaugh | 152/225 C |
| 2,646,834 | 7/1953 | Rusch | 152/225 C |
| 2,867,259 | 1/1959 | Barron | 152/225 C |
| 3,291,180 | 12/1966 | Gellman | 152/225 C |

Primary Examiner—James B. Marbert
Attorney, Agent, or Firm—Ashlan F. Harlan, Jr.

[57] ABSTRACT

A traction device comprising a pair of telescopic tubular members, the outer one of which engages the peripheral surface of a vehicle tire to provide improved traction. These members are provided with perpendicularly extending clamping rods connected to the outer ends thereof for engagement against the side walls of the tire. One of the rods is provided with an inwardly bent end portion having a resilient sleeve thereon for clamping engagement on the rim of the wheel. Means are also provided for axially moving the members relative to each other for drawing the rods into clamping engagement against the side of the tire.

12 Claims, 6 Drawing Figures

PATENTED JAN 21 1975
3,861,437
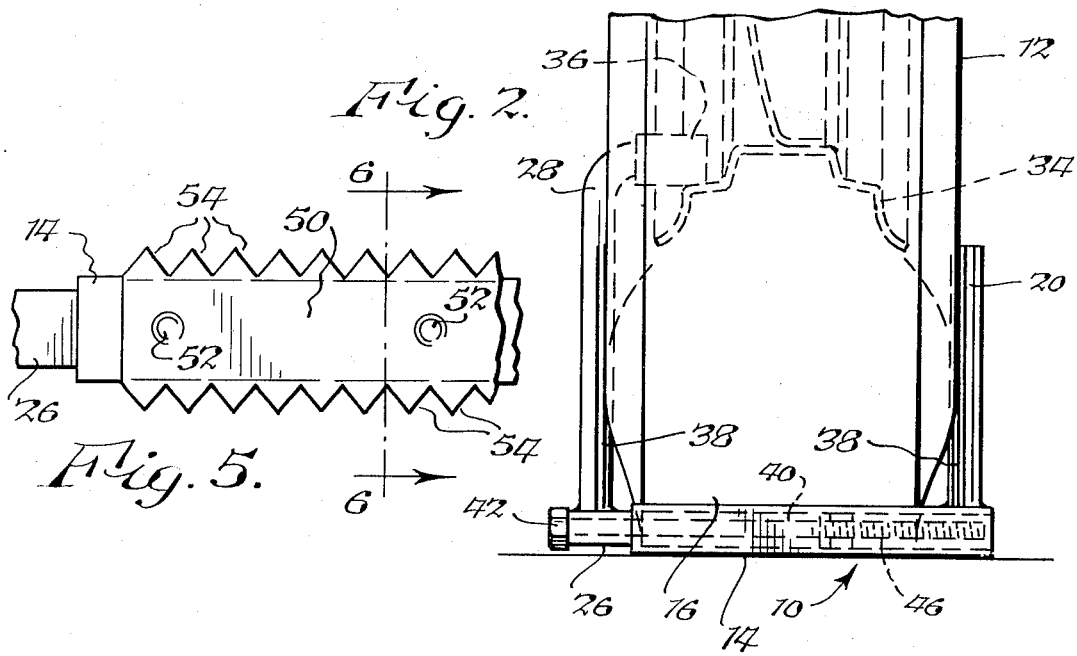
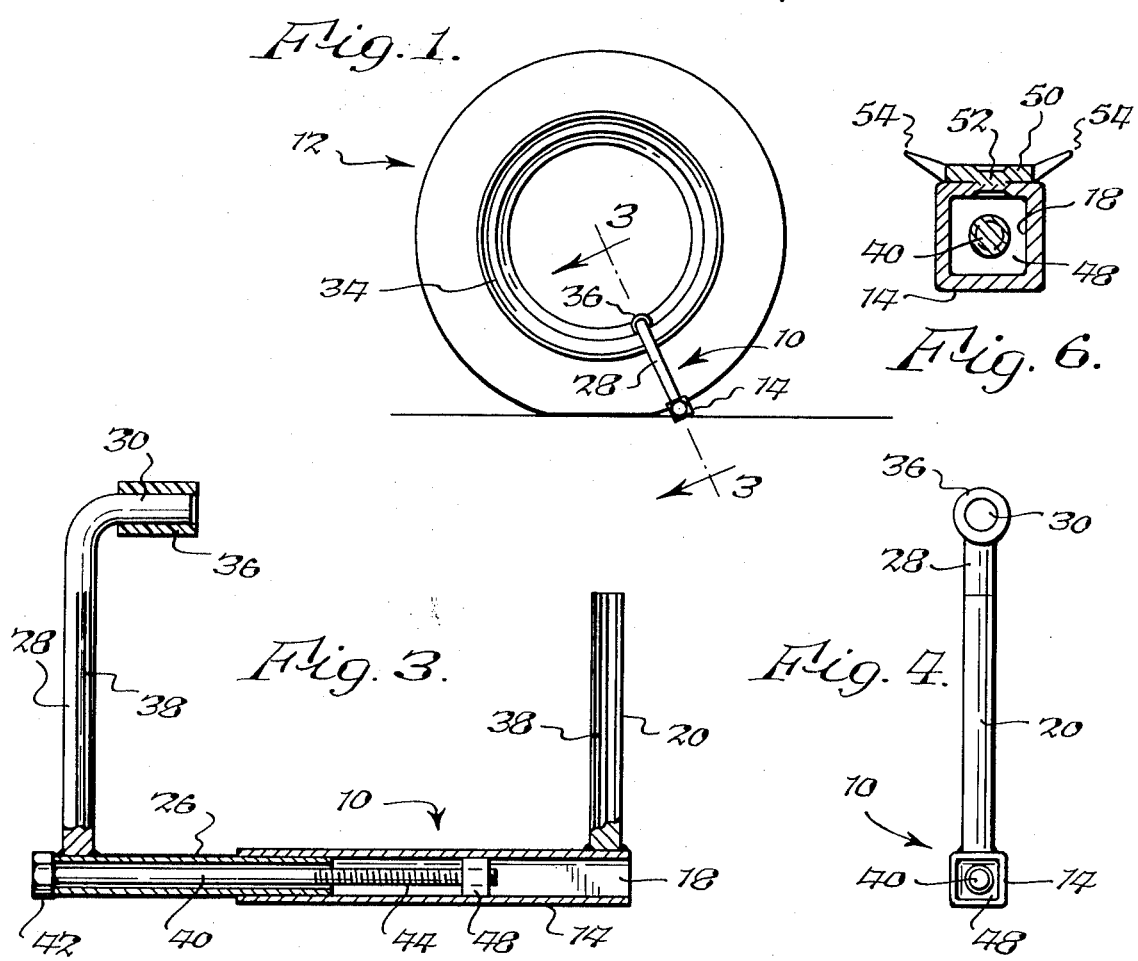

TRACTION DEVICE FOR VEHICLE TIRES

BACKGROUND OF THE INVENTION

This invention relates to a traction device adapted to be readily applied and secured to a vehicle tire and removed therefrom.

Various types of vehicle tire traction attachments have been developed to facilitate the movement of a vehicle when the traction tires thereof lose traction in soft, slippery, or flowable material such as snow, mud, or sand. These known attachments, such as chains for example, have been designed mainly for temporary securement to a vehicle tire or wheel for use under abnormally adverse conditions, for example when the vehicle is stuck in mud or travelling in deep snow, and they may be removed from the tire when conditions no longer warrant their use.

Although these known tire traction attachments are generally satisfactory for their intended purposes, they possess certain disadvantages. By way of example, they are relatively expensive, time-consuming and awkward to apply to a vehicle tire, and often require the vehicle to be raised in order to lift the tire from the ground so as to properly fit the attachment on the tire. This poses an especially difficult problem when a vehicle wheel is partially embedded in snow, sand, or a mud-hole. Also, very often it is virtually impossible for a solitary person, especially a woman, to properly apply these known attachments to the vehicle tire.

SUMMARY OF THE INVENTION

The traction device of the present invention, as hereinafter described in detail, obviates the above noted disadvantages by providing an improved traction device in the form of an attachment which can be readily applied to and removed from a vehicle tire with a minimum of effort by a solitary driver or other person without lifting the tire from the ground, which is simple and strong in construction, durable and rugged in use, relatively low in cost, and which can be conveniently stowed away in the vehicle trunk.

The traction device of this invention is characterized by the provision of a pair of telescopic tubular members each provided with a rod at its outer end to form, when parallel with each other, a device, generally U-shaped in configuration, engagable with the peripheral tread and the side walls of a vehicle tire. One of the rods is provided with an inwardly bent end portion for clamping engagement on an annular surface on the rim of the vehicle tire when the rods are moved toward each other and held against the tire side walls. Means are provided for releasably securing the telescopic members together in the selected clamping position on the vehicle tire, one of the telescopic members serving as a shoe element to provide improved traction.

BRIEF DESCRIPTION OF THE DRAWING

FIG. 1 is a side elevational view of a vehicle tire provided with a traction device constructed in accordance with the principles of this invention.

FIG. 2 is a front elevational view, on an enlarged sacle, of the traction device of FIG. 1, shown attached to a vehicle tire;

FIG. 3 is a transverse, cross-sectional view, partly in elevation and on an enlarged scale, taken on the line 3—3 of FIG. 1;

FIG. 4 is a side elevational view of the traction device of FIG. 2;

FIG. 5 is an enlarged, fragmentary detail view illustrating a modification of the invention; and FIG. 6 is a sectional view taken on the line 6—6 of FIG. 5.

DETAILED DESCRIPTION OF AN EMBODIMENT

Referring now in detail to the drawing, in FIG. 1 a traction device, comprehensively designated 10 and constructed in accordance with this invention, is shown attached to a vehicle tire 12. While more than one traction device 10 may be used per tire as dictated by the requirements of a particular situation, it has been found that only one such traction device 10 on each traction tire will suffice for virtually all occasions.

As shown in the illustrative embodiment of FIGS. 2–4, each traction device 10 comprises an elongated hollow traction member 14, having a generally square configuration in cross section and adapted to bear against the peripheral tread 16 of the tire 12, across the width thereof, which serves as a gripping shoe element for engagement with the ground to provide improved traction. The tubular member 14 has a length exceeding the width of the peripheral tread 16 of tire 12 and has a bore 18 extending therethrough defined by the flat sided walls of the member 14.

The hollow clamping member 14 is provided with a clamping rod 20 welded or otherwise fixedly secured at one end thereof to the outer surface of the member 14, preferably at or closely adjacent one end of the latter, and extending perpendicularly to the member 14 thus forming a generally L-shaped configuration, as shown in FIGS. 2 and 3.

A second elongated, tubular member 26 is telescopically received in the member 14 and has a generally square configuration in cross section conforming to the shape of the bore 18 but slightly smaller than the latter to permit sliding movement of the member 26 in the member 14. The flat sided configurations of bore 18 and member 26 constitute means preventing rotation of the latter within the member 14 during relative sliding movements therebetween. A clamping rod 28 is welded or otherwise rigidly secured at one end thereof to the outer surface of the member 26, preferably closely adjacent the outer end of the latter, and extends in a direction normal to the member 26 forming a generally L-shaped configuration therewith. The free end 30 of the rod 28 is bent inwardly substantially normal to the main portion of the rod and is adapted for clamping engagement against an annular surface of the tire rim 34 when the traction device 10 is secured to the tire 12. A protective sleeve 36, preferably formed of a resiliently yeildable material such as rubber or a suitable synthetic plastic material, is suitably secured on the rod end portion 30 to prevent marring the tire rim 34. If desired, either or both of the clamping rods 20 and 28 may be provided with serrations, such as ribs 38, on their inwardly facing surfaces for increased gripping engagement against the opposite side walls of the tire 12 when they are clamped thereto.

The tubular members 14 and 26 are held in a selected telescopic relation by an elongated bolt 40 having a head 42 bearing against the outer end face of member 26 and a threaded shank 44 extending through the member 26 into the member 14. The end of the shank 44 is threadedly engaged in a nut 48 disposed within the bore 18 of the outer telescopic member 14 and welded or otherwise fixedly secured therein. Thus, the traction device 10 is adjustable to fit tires of different sizes, yet may be securely clamped thereon.

To further insure gripping of the vehicle tire 12 by the traction device 10 a modified structure of the latter, as shown in FIGS. 5 and 6, may be employed. As there shown, a gripping plate 50 is suitably secured, for example by a plurality of welds 52, to the upper surface of the tubular member 14. The plate is provided with a series of relatively sharp teeth 54 along each side edge thereof that are inclined slightly upwardly so as to firmly engage the peripheral tread of the tire 12 when the device 10 is mounted thereon.

The traction device of the present invention is relatively simple in construction and can be readily assembled and mounted on a vehicle tire, or removed therefrom, as desired. For expeditious and easy attachment to the tire of a traction wheel when necessary, the traction device can be stored in an assembled relation with the member 26 in an extended position such as shown in FIG. 3, relative to member 14, wherein the clamping rods 20 and 29 are at a maximum spaced-apart distance, thus enabling the traction device to be readily slipped over the tire. However, if the width of the tire exceeds the spacing between the rod end portion 30 and the rod 20 when the traction device is extended to the maximum, the latter may be applied to the tire in two sections. To this end, the member 14 is placed against the periphery of the tire 12 in close proximity to the peripheral tread surface thereof with the clamping rod 20 engaging against the inner side wall of the tire. The free end of the tubular member 26 is then inserted in the bore 18 of shoe element 14 with the rod 28 extending in the same direction as the rod 20. The rods 20 and 28 are then drawn toward each other and held in position by threading the bolt 40 into the nut 48 until the rods firmly engage the opposite side-walls of the tire and the bent end 30 of the rod 28 engages the wheel rim 34. When so engaged, it prevents the traction device from coming off of the tire under the action of centrifugal force or from being twisted off by rotation around the tubular member 26.

In use, when the weight of the wheel and the load carried thereby rest on the shoe element or member 14, the height of the tire at that point is diminished and the rim surface engaged by the rod end 30 is displaced away from the latter. However, this is accompanied by outward bulging of the tire side-walls so that the rods 20 and 28 of the device 10 are gripped more firmly by the tire and thereby tend to remain in place. Engagement of the teeth 54 on the plate 50 with the peripheral tire tread will also tend to maintain the device in place on the tire.

While the material of the various elements, except for the protective sleeve 36, comprising the traction device 10 is preferably metal, such as steel for example, it should be understood that any suitable material having the necessary strength, rigidity and durability may be used if desired. The telescopic tubular members 14 and 26 and the rods 20 and 28 may be of any suitable and desired diameter and cross-sectional configuration. Further, although a specific traction device can be adjusted to fit a number of tire sizes, smaller and larger devices can be constructed, thus permitting the use of such devices on tires of any size. Numerous other modifications of the structure are also possible. For example, the mounting of the rods 20 and 28 and the placement of the nut 48 can be reversed, i.e., rod 20 can be secured on the member 26 and rod 28 on shoe element 14 with the nut 48 being carried by the member 26. With such an arrangement, the bolt 40 would be inserted through the outer open end of shoe element 14 with the bolt head 42 bearing against the outer end face thereof.

The present invention thus provides a simple, strong and inexpensive traction device for quick and easy attachment to and removal from a vehicle tire by one person, unaided, with a minimum of effort and inconvenience. The traction device can be conveniently and compactly stowed in the vehicle trunk for convenient accessibility when the need arises. It has been found that generally only one traction device is required for each of the traction tires of a vehicle to permit the vehicle to extricate itself when the traction wheels are embedded in sand, mud, snow or the like. However, if deisred a plurality of such devices can be used on each traction wheel.

A preferred embodiment of the principles of this invention having been described and illustrated in detail with certain possible embodiments mentioned, it should be understood that numerous other modifications thereof can be made without departing from the broad spirit and scope of this invention, as defined in the appended claims.

I claim:

1. A traction device for use with a vehicle tire mounted on a rim comprising: a tubular shoe element engageable with the peripheral surface of a vehicle tire and extending there-across; a tubular member telescopically received in said shoe element and projecting axially outwardly of said shoe element; a first rod attached at one end adjacent the outer end of said shoe element; a second rod attached at one end adjacent the outer end of said tubular member; said rods extending substantially normal to said shoe element and said tubular member and being adapted to form therewith a generally U-shaped configuration, said second rod having a bent end portion engagable with said rim and being substantially longer than said first rod; clamping means adjustably connecting said shoe element and said tubular member in telescopic relation to hold said rods against said tire; and gripping means on said shoe element having teeth adapted to engage the peripheral tread of said tire.

2. A traction device as set forth in claim 1 wherein said shoe element has a flat sided configuration in cross section and said tubular member has a complementary flat sided configuration in cross section preventing relative rotation between said member and said shoe element, and wherein said clamping means comprises a bolt extending through said tubular member into said shoe element for threaded engagement with a nut fixedly secured in said shoe element.

3. A traction device as set forth in claim 1 wherein the bent end portion of said second rod is substantially normal to the main portion of said rod.

4. A traction device as set forth in claim 2 wherein the bent end portion of said second rod is substantially normal to the main portion of said rod.

5. A traction device as set forth in claim 1 wherein the teeth of said gripping means are in two divergently projecting sets.

6. A traction device as set forth in claim 2 wherein the teeth of said gripping means are in two divergently projecting sets.

7. A traction device as set forth in claim 3 wherein the teeth of said gripping means are in two divergently projecting sets.

8. A traction device as set forth in claim 1 wherein said gripping means comprises a plate attached to said shoe element.

9. A traction device as set forth in claim 2 wherein said gripping means comprises a plate attached to said shoe element.

10. A traction device as set forth in claim 4 wherein said gripping means comprises a plate attached to said shoe element.

11. A traction device as set forth in claim 5 wherein said gripping means comprises a plate attached to said shoe element.

12. A traction device as set forth in claim 6 wherein said gripping means comprises a plate attached to said shoe element.

* * * * *